F. S. BARKS.
DRAFT SILL.
APPLICATION FILED MAY 8, 1916.
1,272,355.
Patented July 16, 1918.
3 SHEETS—SHEET 1.
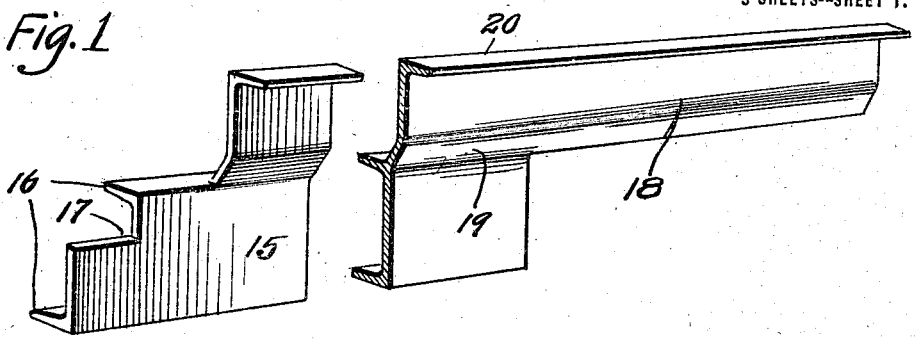
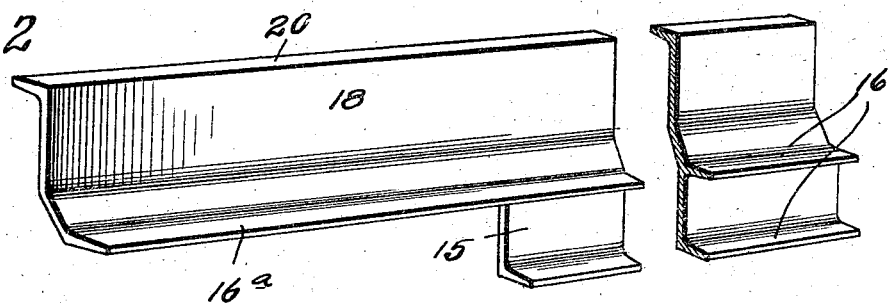
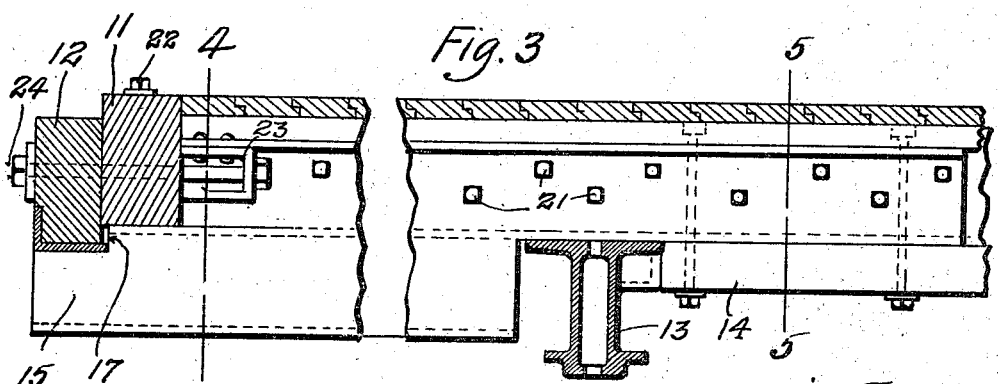
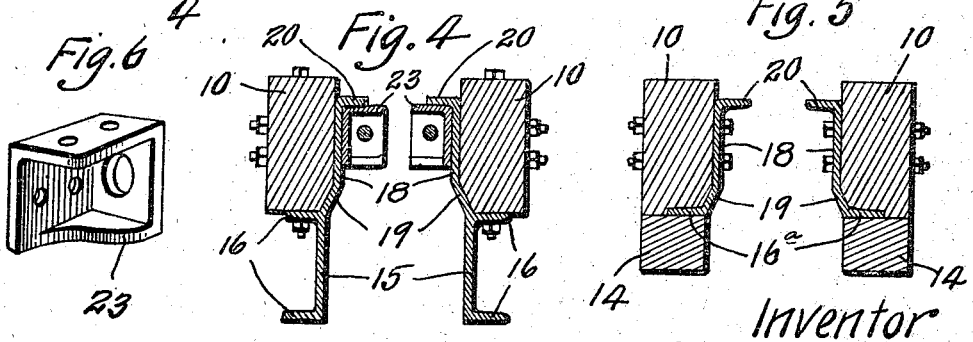
Inventor
Frank S. Barks
By _____ Att'y

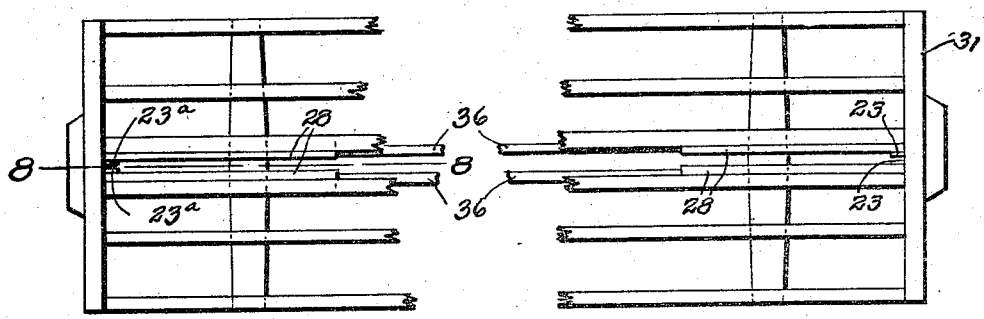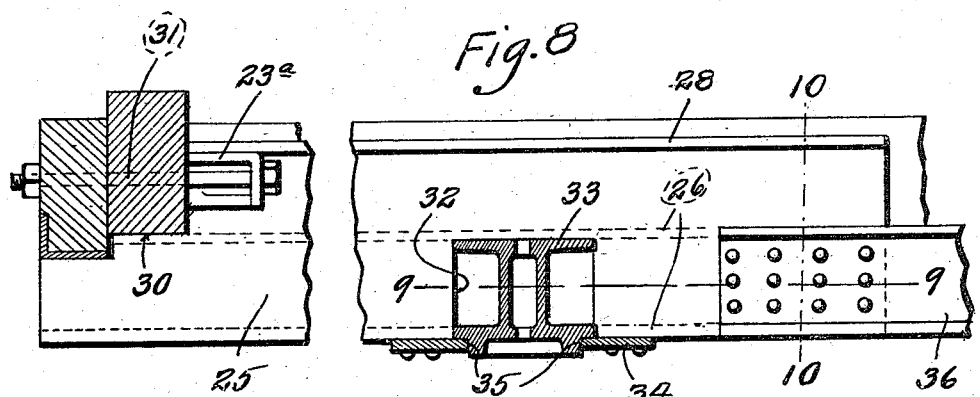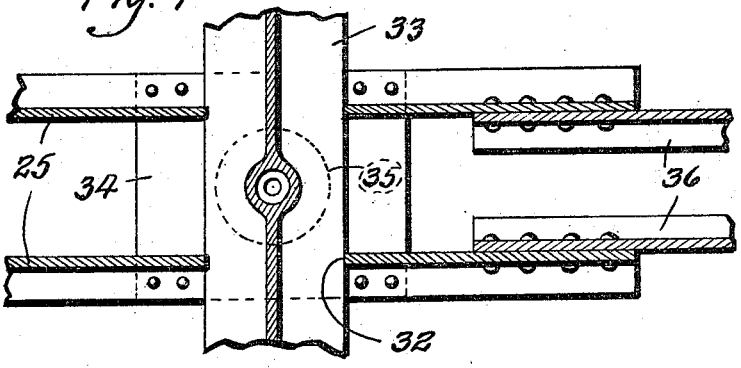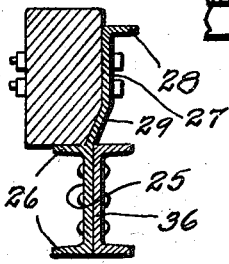

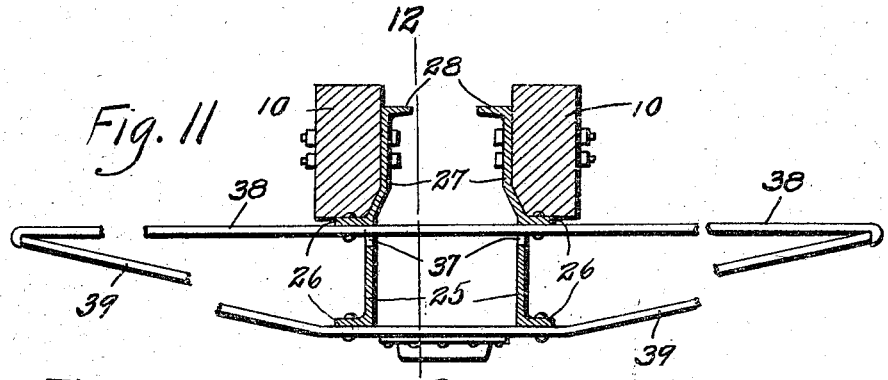
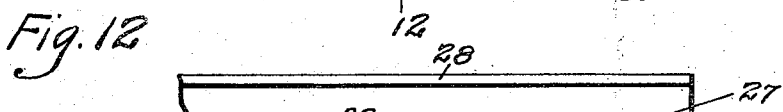
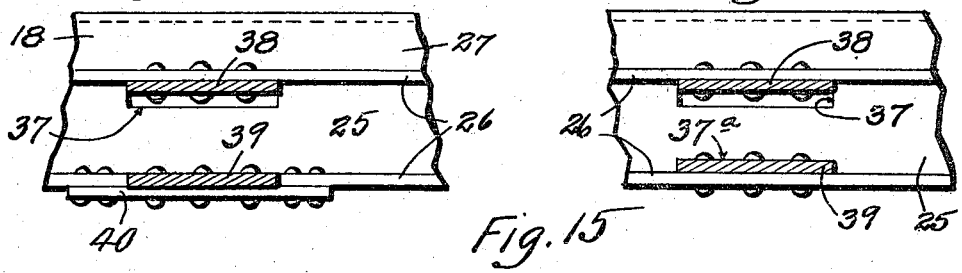
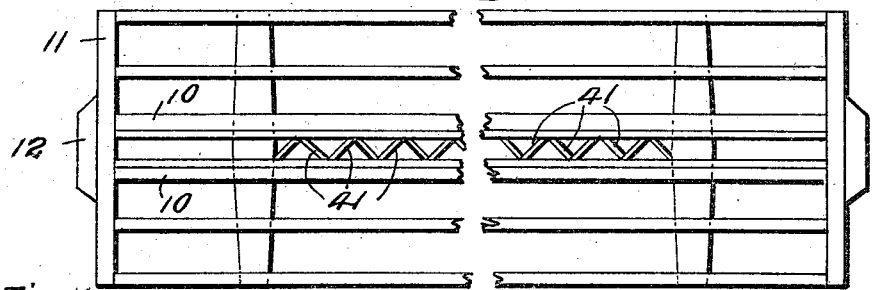

UNITED STATES PATENT OFFICE.

FRANK S. BARKS, OF ST. LOUIS, MISSOURI.

DRAFT-SILL.

1,272,355. Specification of Letters Patent. Patented July 16, 1918.

Application filed May 8, 1916. Serial No. 96,103.

*To all whom it may concern:*

Be it known that I, FRANK S. BARKS, a citizen of the United States, residing at St. Louis, Missouri, have invented a certain new and useful Improvement in Draft-Sills, of which the following is a full, clear, and exact description, such as will enable others skilled in the art to which it appertains to make and use the same, reference being had to the accompanying drawings, forming part of this specification.

My invention relates to draft sills for railway cars, the principal object of my invention being to provide a comparatively simple form of draft sill which may be either rolled or cast, and which, in addition to forming a substantial support for the draft rigging, is effective in transmitting pulling and buffing strains of the draft gear directly to the center and draft sills of the car underframe.

A further object of my invention is to provide draft sills which can be readily combined with wooden center and end sills to form a structure having exceptional strength and which structure combined with the bolster is instrumental in distributing service strains and stresses throughout a comparatively large area of the underframe.

The above, as well as other objects which may hereinafter appear, I attain by means of the construction which I have illustrated in the preferred form in the accompanying drawings, wherein—

Figures 1 and 2 are perspective views of a draft sill of my improved construction.

Fig. 3 is a vertical section taken lengthwise through the end portion of a car underframe and showing my improved draft sill in position for use.

Fig. 4 is a cross section taken on the line 4—4 of Fig. 3.

Fig. 5 is a cross section taken on the line 5—5 of Fig. 3.

Fig. 6 is a perspective view of a bracket which serves as a point of attachment for the tie rod between the end of one of the draft sills and the buffer block.

Fig. 7 is a plan view of a car underframe with which draft sills of my improved construction are associated.

Fig. 8 is an enlarged section taken approximately on the line 8—8 of Fig. 7.

Fig. 9 is a horizontal section taken approximately on the line 9—9 of Fig. 8.

Fig. 10 is a vertical section taken approximately on the line 10—10 of Fig. 8.

Fig. 11 is a cross sectional view showing draft sills of my improved construction associated with a plate bolster.

Fig. 12 is a vertical section taken approximately on the line 12—12 of Fig. 11.

Fig. 13 is a vertical section similar to Fig. 12 and showing a modified form of plate bolster combined with my improved draft sill.

Fig. 14 is a detail section showing a further modified combination of plate bolster and draft sill.

Fig. 15 is a plan view of an underframe, the same being equipped with draft sills of my improved construction and which sills extend the entire length of the underframe.

Fig. 16 is an elevational view of a draft sill embodying my invention, the same being of the type which extends the entire length of the car, said sill being notched to receive the bolsters.

Referring by numerals to the accompanying drawings and particularly the construction illustrated in Figs. 1 to 6 inclusive, 10 designates the wooden center sills of a car underframe, 11 the end sill, 12 the buffer block, 13 the bolster, and 14 the sub-sills, which latter are positioned immediately beneath the center sills 10 and fixed thereto in any suitable manner. The ends of these subsills bear directly against suitable brackets formed integral with or fixed to the bolster. (See Fig. 3.)

The draft sill contemplated by my invention is preferably rolled to proper shape from a single piece of metal, although, if desired, it may be cast. and said sill comprises a vertically disposed web portion 15, the upper and lower edges of which are provided with outwardly presented horizontally disposed parallel flanges 16. This portion of the draft sill is positioned in front of the bolster 13 and the web portion 15 serves as the side wall of the housing for the draft rigging, it being understood that a suitable cheek plate or lugs are rigidly fixed to said web for the accommodation of parts of the draft rigging.

The outer upper corner of the web 15 and the adjacent portion of top flange 16 are cut away as designated by 17 in order to receive the lower inner corner of the buffer block 12. The rear upper portion of the draft sill comprises a vertically disposed web portion 18 which occupies a vertical plane parallel with the plane occupied by the web 15 and the forward portion of said web 18 is integrally connected to web 15 by a curved or inclined web 19.

Formed integral with the upper edge of web 18 is a horizontally disposed inwardly projecting flange 20, the same occupying a plane parallel with the planes occupied by the flanges 16.

The upper portion of the sill extends for a substantial distance beyond the rear end of the lower portion and the flange 16 at the top of the lower portion of the sill is extended rearwardly to form an outwardly presented flange 16ª at the bottom of said rearward extension, and which flange is parallel with the inwardly presented flange 20. Thus, the lower portion of the sill is substantially channel-shape in cross section while the upper portion is Z-shape in cross section, said portions being connected by the curved or inclined web portion 19.

The front end of the upper portion of the sill terminates a short distance to the rear of the front end of the lower portion and when the sill is combined with the other parts of the underframe, the forward end of the upper portion bears directly against the rear face of the end sill 11, and said upper portion overlies the bolster 13 and extends for a substantial distance to the rear thereof alongside the inner face of the corresponding center sill 10.

Seated in web 18 and the adjacent center sill 10 are bolts 21 which rigidly connect said parts and seated in the end sill 11 and the forward end of the upper one of flanges 16 are bolts 22.

Rigidly fixed in any suitable manner to the forward ends of the webs 18 of the draft sills are angle brackets 23 and secured thereto and passing through the end sill 11 and buffer block 12 are bolts 24.

The flanges 16ª projecting outwardly from the lower portions of the webs 18 are positioned between the draft sills 10 and the sub-sills 14, as illustrated in Fig. 5.

The type of draft sill just described is comparatively simple, can be easily and cheaply manufactured by reason of the fact that it can be readily rolled and when properly applied for use, the sills, in addition to forming a firm and substantial support for the draft rigging, are effective in transmitting the pulling and buffing strains of the draft rigging directly to the center sills, end sill, and parts of the car underframe associated therewith.

In the construction illustrated in Figs. 7 to 10 inclusive, each sill is formed in a single piece, preferably of rolled metal, and substantially of the same cross sectional shape throughout its length.

The lower portion of the sill is in the form of a channel composed of a vertically disposed web 25 provided at its upper and lower edges with outwardly projecting parallel flanges 26.

The upper portion of the sill is in the form of an angle bar composed of a vertically disposed web portion 27 which occupies a plane parallel with and slightly offset with respect to the plane occupied by web 25 and formed integral with the upper edge of said web 27 is an inwardly presented flange 28 which is parallel with the flanges 26.

The two portions thus formed are integrally connected by a curved or inclined web portion 29.

The outer upper corner of the sill member thus constructed is cut away as designated by 30 to receive the end sill and buffer block of the car underframe and rigidly fixed in any suitable manner to the outer end of the web portion 27 of the sill member is an angle bracket 23ª to which is connected a tie rod 31, the same extending through the adjacent end sill and buffer block. A portion of the lower part of the sill is cut away to form a comparatively large notch or opening 32, the same being substantially rectangular in order to receive the bolster 33 and positioned beneath said bolster and the adjacent parts of the sills is a plate 34, the same being rigidly fixed to the lower flanges of the bolster and the lower flanges 26 by means of rivets or like fastening devices. Formed through this plate 34 is an opening 35 which accommodates the center bearing ring on the underside of the bolster.

The draft sills thus constructed extend a substantial distance inside the bolster, and fixed in any suitable manner to said inwardly extending ends are the ends of metal sills 36, the opposite ends of which are connected directly to draft sills at the opposite ends of the car underframe.

When the sills thus constructed are applied for use, the webs 27 of the upper portion lie directly against the inner faces of the wooden center sills, as illustrated in Fig. 10, said parts being secured to each other by bolts or in any suitable manner.

By virtue of the construction just described, all pulling and buffing strains from the draft rigging supported between the webs 25 in front of the bolster will be transmitted in straight lines directly through the rear portions of the draft sills to the sills 36, and likewise to the wooden center sills, and thus said strains are distributed and equalized throughout a comparatively large portion of the car underframe.

Where draft sills of my improved construction are associated with a plate bolster, suitable openings 37 are formed through the webs 25 for the accommodation of the upset ends of the upper member 38 of the bolster, and after said upper member has been inserted through said openings, it is rigidly connected to the upper flanges 26 by means of rivets or like fastening devices while the lower member 39 of said plate bolster passes beneath the draft sills and is secured to the lower flanges 26 in any suitable manner. (See Figs. 12 and 13.)

In some instances where a plate bolster is associated with my improved draft sill, it may be necessary to notch the lower portion of the sill and where such construction is carried out, a plate 40 is positioned beneath the lower member of the bolster and secured by rivets or like fastening device to the lower flange of the sill, as illustrated in Fig. 13.

In Fig. 14 I have illustrated the sill as being provided with an opening 37ª near the bottom flange, which opening accommodates the lower member of the plate bolster.

In Fig. 15 I have illustrated draft sills embodying my invention, said sills being of sufficient length to extend from one end sill of the underframe to the other and where such construction is employed, said draft sills may be tied together by means of plates or lacing bars 41 which are secured by means of rivets or the like to the bottom flanges of the sills.

In Fig. 16 I have illustrated a draft sill which is adapted to extend the entire length of the underframe and said sill being notched near its ends as designated by 42 to accommodate the bolsters.

By virtue of the constructions just described, the pulling and buffing strains impressed on the draft rigging are transmitted throughout the entire area of the underframe or to practically all of the members thereof.

Draft sills of my improved construction can be very easily and cheaply manufactured, combine readily with the various parts entering into the construction of underframes now in general use, and said draft sills, in addition to materially reinforcing and strengthening the end portions of car underframes, are effective in transmitting the pulling and buffing strains of the draft rigging directly to the center sills and associated parts of the underframe.

It will be readily understood that minor changes in the size, form and construction of the various parts of my improved draft sill can be made and substituted for those herein shown and described, without departing from the spirit of my invention, the scope of which is set forth in the appended claims.

I claim:

1. The herein described draft sill formed in a single piece and comprising a front lower portion having the same cross sectional shape throughout its length and composed of a vertical web and a pair of outwardly presented parallel flanges, and an upper rear portion having the same cross sectional shape throughout its length and composed of a vertically disposed web and a horizontally disposed flange projecting inwardly from the upper portion thereof.

2. The herein described draft sill formed in a single piece and comprising a front lower portion having the same cross sectional shape throughout its length and composed of a vertical web and a pair of outwardly presented parallel flanges, and an upper rear portion having the same cross sectional shape throughout its length and composed of a vertically disposed web and a horizontally disposed flange projecting inwardly from the upper portion thereof and the vertically disposed webs of the two portions being off-set with respect to each other.

3. The herein described draft sill formed in a single piece and comprising a front lower portion having the same cross sectional shape throughout its length and composed of a vertical web and a pair of outwardly presented parallel flanges, and an upper rear portion having the same cross sectional shape throughout its length and composed of a vertically disposed web and a horizontally disposed flange projecting inwardly from the upper portion thereof, said last mentioned flange occupying a plane parallel with the planes occupied by the first mentioned flanges.

4. The herein described draft sill comprising a front lower web portion and a rear upper web portion said web portions being integrally connected and off-set transversely and longitudinally with respect to each other, an outwardly presented flange integral with the lower edge of the front lower portion, an inwardly presented flange integral with the upper edge of the upper rear portion, and a continuous outwardly presented flange integral with the upper edge of the front lower portion and the lower edge of the rear upper portion all of said flanges being straight and occupying parallel planes.

5. The herein described draft sill formed in a single piece and comprising a lower front portion which is channel-shape in cross section with the flanges outwardly presented, and a rear upper portion which is substantially Z-shape in cross section with the upper flange inwardly presented and the lower flange being a continuation of the outwardly presented flange at the upper edge of the lower front portion, all of said flanges being straight and occupying parallel horizontal planes.

6. The herein described draft sill comprising a front lower web member, a rear upper web member, said web members being integrally connected and off-set transversely with respect to each other, an integral outwardly presented flange on the lower portion of the lower front web member, an inwardly presented flange integral with the upper portion of the upper rear web member, and an outwardly presented flange integral with the upper edge of the lower front web member and with the lower edge of the rear upper web member, all of said flanges being straight and occupying parallel horizontal planes.

7. The herein described draft sill comprising a front lower web member, a rear upper web member, said web members being integrally connected and off-set transversely with respect to each other, an integral outwardly presented flange on the lower portion of the lower front web member, an inwardly presented flange integral with the upper portion of the upper rear web member, and an outwardly presented flange integral with the upper edge of the lower front web member and with the lower edge of the rear upper web member, all of which flanges are straight and occupy parallel horizontal planes.

8. The combination with railway car center sills, bolster and end sill, of draft sills associated with said parts, each of which draft sills is formed in a single piece and comprises a front lower portion arranged in front of the bolster beneath the end sill and composed of a vertical web and a pair of outwardly presented parallel flanges, and an upper rear portion overlying the bolster and secured to one of the center sills, which upper rear portion comprises a vertically disposed web and a horizontally disposed flange projecting inwardly from the upper edge thereof, all of said flanges being straight and occupying parallel horizontal planes.

9. The combination with railway car center sills, bolster, and end sill, of draft sills associated with said parts, each of which draft sills is formed in a single piece and comprises a front lower portion arranged in front of the bolster beneath the end sill and composed of a vertical web and a pair of outwardly presented parallel flanges, and an upper rear portion overlying the bolster and secured to one of the center sills, which upper rear portion comprises a vertically disposed web, and integral flanges projecting in opposite directions from the upper and lower portions of said last mentioned web, all of said flanges being straight and occupying parallel horizontal planes.

10. The combination with railway car center sills, bolster, and end sill, of draft sills associated with said parts, each of which draft sills is formed in a single piece and comprises a front lower portion arranged in front of the bolster beneath the end sill and composed of a vertical web and a pair of outwardly presented parallel flanges, and an upper rear portion overlying the bolster and secured to one of the center sills, which upper rear portion comprises a vertically disposed web, and integral flanges projecting in opposite directions from the upper and lower portions of said last mentioned web, all of which flanges are straight and occupy parallel horizontal planes.

11. The combination with railway car center sills, bolster, and end sill, of draft sills associated with said parts, each of which draft sills comprises a front lower portion which is channel-shape in cross section with the flanges outwardly presented, said lower front portion being arranged in front of the bolster and beneath the end sill, and a rear upper portion overlying the bolster and secured to one of the center sills, which rear upper portion is substantially Z-shape in cross section with the upper flange inwardly presented and the lower flange being a continuation of the upper one of the outwardly presented flanges on the lower front portion, all of said flanges being straight and occupying parallel horizontal planes.

12. The combination with railway car center sills, bolster, and end sill, of draft sills associated with said parts, each of which draft sills comprises a lower front portion positioned in front of the bolster and beneath the end sill, a rear upper portion integrally connected to said lower front portion and overlying the bolster and secured to one of the center sills, brackets fixed to the forward portions of the draft sills, and tie rods seated in said brackets and the end sill for rigidly connecting the draft sills to said end sill.

In testimony whereof I hereunto affix my signature in the presence of two witnesses, this 6th day of May, 1916.

FRANK S. BARKS.

Witnesses:
M. P. SMITH,
M. A. HANDEL.